US012765714B2

(12) United States Patent
Khizar

(10) Patent No.: US 12,765,714 B2
(45) Date of Patent: Oct. 20, 2026

(54) CRISP PLATE FOR MICROWAVE OVENS

(71) Applicant: WHIRLPOOL CORPORATION, Benton Harbor, MI (US)

(72) Inventor: Muhammad Khizar, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 1008 days.

(21) Appl. No.: 17/941,707

(22) Filed: Sep. 9, 2022

(65) Prior Publication Data

US 2023/0079434 A1 Mar. 16, 2023

(30) Foreign Application Priority Data

Sep. 14, 2021 (EP) .................................... 21196681

(51) Int. Cl.
*A47J 36/02* (2006.01)
*A47J 37/06* (2006.01)
*H05B 6/64* (2006.01)

(52) U.S. Cl.
CPC ......... *A47J 36/027* (2013.01); *A47J 37/0629* (2013.01); *H05B 6/6408* (2013.01); *H05B 6/6494* (2013.01)

(58) Field of Classification Search
CPC .. H05B 6/6408; H05B 6/6494; A47J 37/0629; A47J 36/027
See application file for complete search history.

(56) References Cited

U.S. PATENT DOCUMENTS

| | | | | |
|---|---|---|---|---|
| 5,449,887 | A | 9/1995 | Holcombe et al. | |
| 5,523,549 | A * | 6/1996 | Tenzer | H05B 6/6494 426/243 |
| 7,339,146 | B2 | 3/2008 | Aisenbrey | |
| 2006/0237451 | A1 | 10/2006 | Samuels | |
| 2008/0032060 | A1* | 2/2008 | Nesbitt | B65G 49/064 427/470 |
| 2018/0057244 | A1 | 3/2018 | Boek et al. | |
| 2018/0220500 | A1 | 8/2018 | Staton et al. | |
| 2020/0163172 | A1* | 5/2020 | Khizar | B29C 70/882 |

FOREIGN PATENT DOCUMENTS

| | | | |
|---|---|---|---|
| EP | 3654736 | B1 | 3/2021 |
| IT | MC20090176 | A1 | 1/2011 |

OTHER PUBLICATIONS

US 10,251,133 B2, 04/2019, Linton (withdrawn)
European Search Report for EP 21196681.7 dated Feb. 22, 2022, 6 pages.

* cited by examiner

*Primary Examiner* — Elizabeth M Kerr
*Assistant Examiner* — Kuangyue Chen
(74) *Attorney, Agent, or Firm* — Brooks Kushman P.C.

(57) ABSTRACT

A plate for a microwave oven includes a substrate layer for supporting food items to be heated in the microwave oven, with the substrate layer having a first surface. The plate also includes a coating layer on the first surface. The coating layer includes at least one of a ferritic material and a boron nitride compound. The coating layer is configured to be heated by electromagnetic radiation irradiated by the microwave oven.

16 Claims, 4 Drawing Sheets

FIG.1
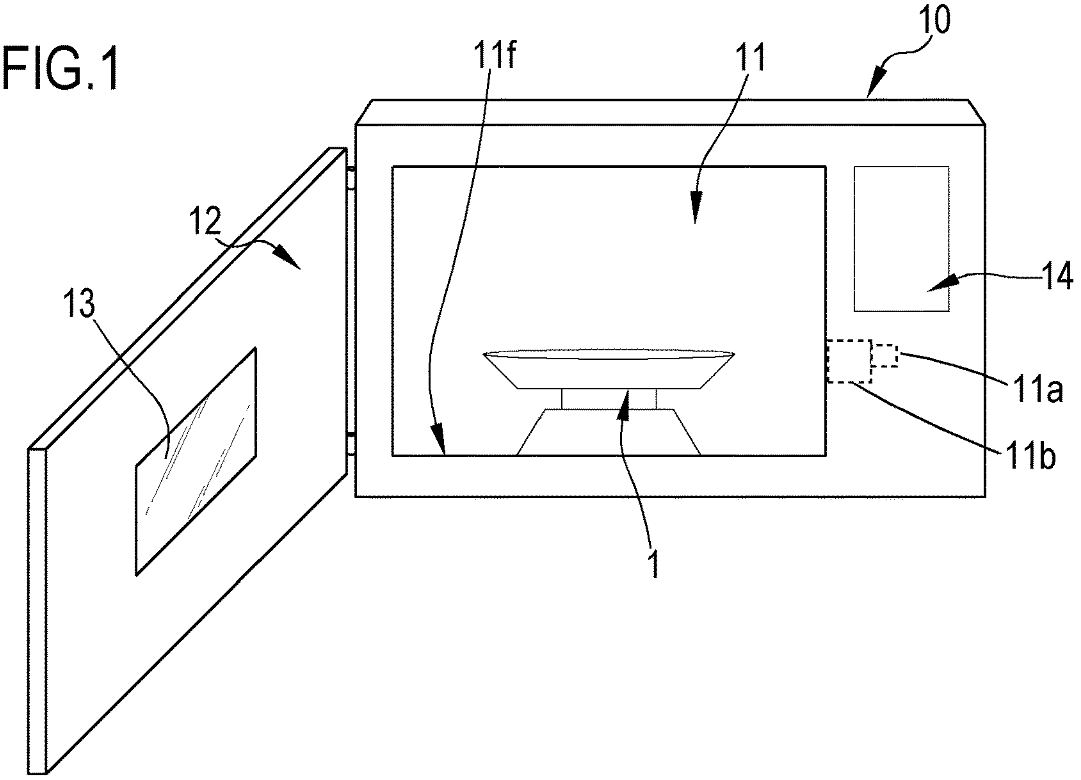
FIG.2
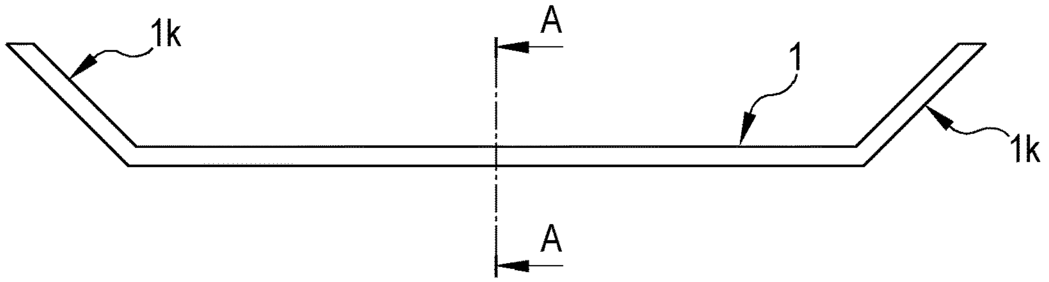
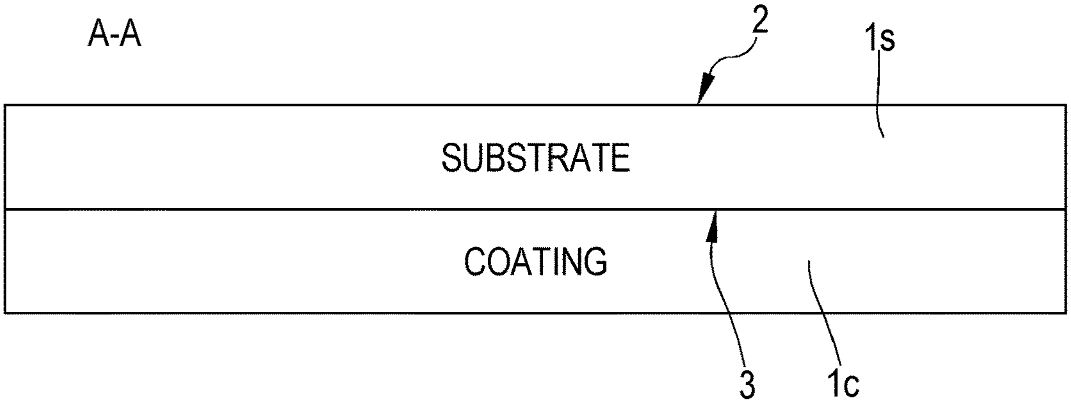
FIG.3

CRISP PLATE FOR MICROWAVE OVENS

CROSS-REFERENCE TO RELATED APPLICATIONS

This application claims foreign priority benefits under 35 U.S.C. § 119 (a)-(d) to European patent application 21196681.7, filed Sep. 14, 2021, the disclosure of which is hereby incorporated in its entirety by reference herein.

TECHNICAL FIELD

The present application is directed to household appliances, in particular microwave ovens and parts thereof. More particularly, the present application is directed to a plate or a dish for supporting, in a microwave oven, food items during a heating or a cooking or a thawing process. Such plate or dish is generally known as "crisp plate."

BACKGROUND

In the recent years, microwave ovens have diffused widely also thanks to the increase of their efficiency and of the possibility of cooking also complex foods provided by advanced functions that in past were not available for this kind of ovens.

The microwave ovens are provided with a muffle wherein a supporting plate, also known as "crisp plate" is provided. The supporting plate is configured to be heated by means of the electromagnetic radiation that the microwave oven in use radiates in the muffle.

The supporting plate is realized with a material that, once irradiated by an electromagnetic radiation, heats and diffuses the heat to the food; therefore, the supporting plate helps providing a heat source for assisting the cooking of the food from the bottom part thereof. The supporting plate may be configured to cause a browning of the food.

Electromagnetic radiation is generated typically by means of a magnetron arranged outside, but close to, the muffle and the radiation is directed to the muffle by means of a waveguide. Today's microwave ovens cook food by irradiating microwaves typically in the range of 2-3 GHZ, and precisely exploiting the 2.4-2.5 GHz band, at least for compliance to national regulations and for the effectiveness these wavelengths have for heating foods.

As such a plate for a microwave oven is provided.

SUMMARY

The present application is directed to a crisp plate whose features are disclosed herein. The following aspects can be combined together and/or with portions of the detailed description and/or with the claims.

According to a first aspect, it is herewith disclosed a plate (1) for a microwave oven (10), comprising a substrate layer (1*s*) configured for supporting food items to be cooked in said microwave oven (10) and at least a first coating layer (1*c*), hereinafter interchangeably referred to as the coating layer (1*c*), at least partially juxtaposed and in contact with the substrate layer (1*s*), wherein the coating layer (1*c*) is configured to be heated by means of an electromagnetic radiation in use irradiated by the microwave oven (10) and wherein the coating layer (1*c*) is a multilayer coating comprising at least a first layer (1*c*') and a second layer (1*c*"); the coating layer (1*c*) comprising at least one between a ferritic material and a boron nitride compound.

According to a further non-limiting aspect, the coating layer (1*c*) is configured to be heated when is irradiated by an electromagnetic radiation having a frequency in the field of the microwaves, preferably within the 2-3 GHz band, more preferably within the 2.4-2.5 GHz band.

According to a further non-limiting aspect, the first layer (1*c*') comprises said boron nitride compound and the second layer (1*c*") comprises said ferritic material.

According to a further non-limiting aspect, the first layer (1*c*') is a superficial layer.

According to a further non-limiting aspect, the second layer (1*c*") is a buried layer.

According to a further non-limiting aspect, the plate (1) comprises a contacting surface between the substrate layer (1*s*) and the at least a first coating layer (1*c*), wherein the contacting surface is substantially planar.

According to a further non-limiting aspect, the plate (1) comprises a contacting surface between the first layer (1*c*') and the second layer (1*c*"), said contacting surface being substantially planar.

According to a further non-limiting aspect, the second layer (1*c*") is sandwiched between the first layer (1*c*') and the substrate layer (1*s*).

According to a further non-limiting aspect, the substrate layer (1*s*) comprises an electrically insulating material, said electrically insulating material comprising glass ceramic and/or glass-fiber reinforced-plastics.

According to a further non-limiting aspect, the second layer (1*c*") comprises a polymeric matrix, the polymeric matrix comprising a silicone.

According to a further non-limiting aspect, the silicone comprises a silicone rubber, preferably a RBL-9050-50P Liquid Silicone Rubber.

According to a further non-limiting aspect, the polymeric matrix comprises said silicone rubber in a mixing ratio of 10 to 1 with a catalyst.

According to a further non-limiting aspect, the polymeric matrix comprises a bi-component pre-polymerized polymer.

According to a further non-limiting aspect, the second layer (1*c*") is a composite ferritic-polymer-carbon layer.

According to a further non-limiting aspect, the first layer (1*c*') is an outer, superficial, layer.

According to a further non-limiting aspect, the second layer (1*c*") is in contact with the substrate layer (1*s*).

According to a further non-limiting aspect, said second layer (1*c*") is interposed between the substrate layer (1*s*) and the first layer (1*c*').

According to a further non-limiting aspect, the second layer (1*c*") comprises a carbon material.

According to a further non-limiting aspect, the second layer (1*c*") is a composite layer wherein the carbon material is blended, optionally uniformly blended, with the ferritic material.

According to a further non-limiting aspect, the carbon material comprises carbon nanotubes.

According to a further non-limiting aspect, the ferritic material comprises ferromagnetic nanowires.

According to a further non-limiting aspect, the carbon material comprises a carbon ferritic powder.

According to a further non-limiting aspect, said carbon ferritic powder has a Curie temperature of about 210° C.

According to a further non-limiting aspect, the carbon nanotubes are blended with said ferritic material, optionally with said ferromagnetic nanowires.

According to a further non-limiting aspect, the carbon nanotubes are blended with said ferritic material, optionally with said ferromagnetic nanowires, in an amount of 1.0 wt % to 6 wt %, preferably 1.5 wt % to 5.5 wt % and/or in such a way to keep the second layer (1*c*") substantially electrically insulating.

According to a further non-limiting aspect, the ferritic material comprises at least one of the compounds of the following list: a nickel-manganese ferritic compound, a nickel-copper-zinc ferritic compound, a manganese-zinc ferritic compound.

According to a further non-limiting aspect, the nickel-manganese ferritic compound comprises a $Ni_{0.5}Mn_{0.5}F_2O_4$ compound.

According to a further non-limiting aspect, the $Ni_{0.5}Mn_{0.5}F_2O_4$ compound has a Curie temperature of about 350° C.

According to a further non-limiting aspect, the manganese-zinc ferritic compound comprises a $(Mn_xZn_yFe_2{}^{+1}{}_{-x-y})Fe_3{}^{+2}O_4$ compound.

According to a further non-limiting aspect, the nickel-copper-zinc ferritic compound is a $Ni_{0.60-y}Cu_yZn_{0.42}Fe_{1.98}O_{0.39}$ compound, optionally comprising $Bi_2O_3$.

According to a further non-limiting aspect, said at least a first coating layer (1*c*) comprises an auxiliary layer (1*a*).

According to a further non-limiting aspect, the thickness of the auxiliary layer (1*a*) is substantially constant.

According to a further non-limiting aspect, the auxiliary layer (1*a*) is in substantial contact with the substrate layer (1*s*).

According to a further non-limiting aspect, the first layer (1*c*') and the auxiliary layer (1*a*) comprise said boron nitride compound.

According to a further non-limiting aspect, said boron nitride compound is configured to cause a substantial distribution of heat induced, in use, by the electromagnetic radiation irradiated by the microwave oven (10) and/or is configured to keep a temperature difference between an hottest portion of said plate (1) and a coldest portion of said plate (1) within the range 20° C.-80° C., preferably within the range 30° C.-70° C., more preferably within the range 40° C.-60° C.

According to a further non-limiting aspect, said first layer (1*c*') is arranged at a first side of the second layer (1*c*") and the auxiliary layer (1*a*) is arranged at a second side of the second layer (1*c*").

According to a further non-limiting aspect, the first side is opposite to the second side.

According to a further non-limiting aspect, the auxiliary layer (1*a*) is in contact with the substrate layer (1*s*).

According to a further non-limiting aspect, the at least a first coating layer (1*c*) has a textured surface.

According to a further non-limiting aspect, the at least a first coating layer (1*c*) comprises a plurality of tiles (1*t*) abutting from the substrate layer (1*s*) or comprises a plurality of venting openings (1*v*) configured for allowing a venting of any gaseous residue trapped in the at least a first coating layer (1*c*) and/or in the substrate layer (1*s*).

According to a further non-limiting aspect, at least part of said plurality of tiles (1*t*) has a thickness of 1.5 mm to 3.5 mm, preferably of 2 mm to 3 mm, more preferably of 2.5 mm to 2.75 mm.

According to a further non-limiting aspect, the at least a first coating layer (1*c*) has a thickness of 1 mm to 4.5 mm, preferably 1.5 mm to 4 mm, more preferably 2 mm to 3.5 mm, even more preferably 2.5 mm to 3 mm.

According to a further non-limiting aspect, the substrate layer (1*s*) has a first thickness and the at least a first coating layer (1*c*) has a second thickness; the first thickness being greater than the second thickness.

According to a further non-limiting aspect, the plate (1) comprises the first coating layer (1*c*) and a second coating layer (1*b*).

According to a further non-limiting aspect, the first coating layer (1*c*) is arranged at a first side of the substrate layer (1*s*) and the second coating layer (1*b*) is arranged at a second side of the substrate layer (1*s*), the second side being opposite to the first side.

According to a further non-limiting aspect, the plate (1) comprises a first contacting surface (2) between the substrate layer (1*s*) and the second coating layer (1*b*) and comprises a second contacting surface (3) between the substrate layer (1*s*) and the first coating layer (1*c*); at least one between the first contacting surface (2) and the second contacting surface (3) being substantially planar and/or being substantially parallel to the contacting surface that lays between the first layer (1*c*') and the second layer (1*c*").

According to a further non-limiting aspect, the coating layer (1*c*) is configured to reach at least a surface temperature of 200° C., preferably at least of 210° C., more preferably at least of 220° C. in 3 minutes, when heated by a microwave oven (10) irradiating an electromagnetic radiation at a power of at least 750 W or of at least 950 W, and/or wherein the coating layer (1*c*) is a food-compatible coating layer.

According to a further non-limiting aspect, the first coating layer (1*c*) comprises an auxiliary layer (1*a*) and the second coating layer (1*b*) comprises an auxiliary layer (1*a*').

According to a further non-limiting aspect, the auxiliary layer (1*a*) of the first coating layer (1*c*) and the auxiliary layer (1*a*) of the second coating layer (1*b*) are in contact with the substrate layer (1*s*).

According to a further non-limiting aspect, the second coating layer (1*b*) comprises a plurality of tiles (1*t*) abutting from the substrate layer (1*s*) or comprises a plurality of venting openings (1*v*) configured for allowing a venting of any gaseous residue trapped in the at least a first coating layer (1*c*) and/or in the substrate layer (1*s*).

According to a further non-limiting aspect, the substrate layer (1*s*) and/or the at least a first coating layer (1*c*), optionally the first coating layer (1*c*) and the second coating layer (1*b*), and/or the first layer (1*c*') and the second layer (1*c*") of the first and/or of the second coating layer (1*b*) have a substantially uniform thickness.

According to a further non-limiting aspect, the plate (1) comprises a central, at least partially flat, portion and an external portion (1*k*), raised with respect to the central substantially flat portion or raising from the central, at least partially flat, portion.

According to a further non-limiting aspect, the external portion (1*k*) defines a perimetric raised ring or wall suitable to allow the plate (1) contain substantially fluid and/or liquid food.

According to a further non-limiting aspect, the external portion (1*k*) defines at least one wall that is inclined with respect to the central, at least partially flat, portion.

According to a further non-limiting aspect, the external portion (1*k*) is substantially orthogonal with respect to the central, at least partially flat, portion.

According to a further non-limiting aspect, the plate (1) is self-sustaining.

According to a further aspect, it is herewith disclosed a microwave oven (10) comprising a plate (1) according to one or more of the aspects herein described.

BRIEF DESCRIPTION OF THE DRAWINGS

FIG. 1 shows a schematic view of a microwave oven provided with a plate according to the present disclosure.

FIG. 2 shows a section view of the plate according to the present disclosure.

FIG. 3 shows a section view of the coating layer of an embodiment of the plate according to the present disclosure.

DETAILED DESCRIPTION

Figure 4:
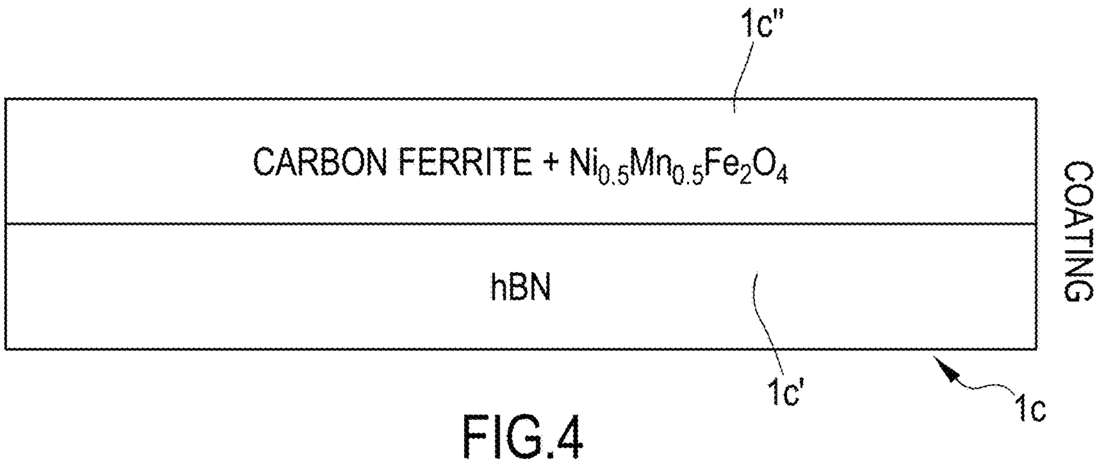
FIG. 4 shows a section view of a coating layer of the plate according to the present disclosure.

Generally, supporting plates for microwave ovens comprise a ferritic coating. The purpose of the ferritic coating is to be heated by the microwaves irradiated by the oven. The conventional supporting plates are subject to some drawbacks. Specifically, the conventional supporting plates have a limiting capability of absorbing microwave radiations, and this limits the amount of heat that they are able to generate. In other words, for reaching a predetermined target temperature, they require a significant amount of electromagnetic radiation power, which may overcook the food. Overcooking of the food may cause a substantial burning, far beyond a wished browning.

In addition, this causes a waste of energy: the microwave oven absorbs more current than that it could be required should the supporting plate properly and highly heat due to microwaves absorption. This, indirectly, causes a shortening of the expected lifetime of the magnetron. As a further side effect, this causes an increase in the time required to obtain a proper cooking of the food.

Moreover, the conventional supporting plates have poor capacity of uniformly distributing the heat across their surfaces. A non-uniform distribution of the heat results in some spots or limited areas of the supporting plate being far hotter than others. This impacts on the quality of cooking, since it is generally known that for the vast majority part of cooking techniques, and uniform cooking temperature of the food is preferable in order to mitigate the risk of obtaining a food wherein some parts are not properly heated and/or wherein some other parts are overcooked or even burnt.

For a proper heating, the materials with which the supporting plates are realized shall have a precise Curie temperature that shall comply with the application. Limitations of the Curie temperature may cause a serious alteration of the behavior of the material, and cause poor heat spreading properties. The cooking, in particular the browning of food in a supporting plate is related to the Curie temperature of the compounds forming the plate, and is in particular related to the Curie temperature of the layer that is conceived to generate heat when invested by the microwaves radiation.

Some supporting plates are at least partially realized in ceramic, which has shown a substantial transparency to the electromagnetic radiations at frequencies typically emitted by today's magnetrons. This implies that for achieving a proper cooking of the food from a bottom part thereof, an extra power is required to the magnetron.

Apart from the energy wasting in pure terms of physics, it is noted that an important parameter for today's production of household appliances, including microwaves, is the compliance to energy efficiency regulations, among which there is Energy Star. A poor energy management and/or requirement impacts on the compliance the oven has with respect to energy efficiency regulations.

Conventional supporting plates provide for a substrate having relevant mechanical properties and a coating for causing the heating of the plate. The conventional coatings require relevant thickness and expensive processing techniques.

It may be further noted that the coating may trap bubbles. In fact, in this latter case, the air contained in the bubbles may heat thereby causing a cracking of the coating, that therefore may detach from the underlying substrate layer.

It has been found that due to the conductive nature of the aluminum the coating of the conventional crisp plates is not efficient enough against microwaves radiation absorption, especially when the microwaves are at a frequency of 2.45 GHz.

European patent EP3654736B1 (in the name of Whirlpool Corporation) discloses a liner for a crisp plate including ceramic nanoparticles in a polymer matrix, with carbon nanoparticles embedded and aligned therein. The polymer matrix of the crisp plate is a two-part pre-polymerized polymer. The carbon nanoparticles are enclosed in a liner that further comprises aluminum particles and nanocrystalline ceramic nanoparticles.

Reference number 1 shows a plate for a microwave oven (the device referenced with the number 1 may also be defined as a dish because the terms "plate" and "dish" shall be seen as synonyms in the present description). The plate 1 is configured to support food to be heated by a microwave oven, in particular by the electromagnetic radiation in use irradiated by the microwave oven 10. The plate 1 of the present disclosure is in particular a so-called "crisp plate", configured to allow the browning of the food therein contained when the plate is irradiated with a microwave electromagnetic radiation.

As shown in FIG. 1, the plate 1 is configured to be housed in the muffle 11 of the microwave oven 10, which further includes a support for the plate 1 which is installed on the bottom 11*f* of the muffle 11. The support is configured to cause the rotation thereof around an axis that, in use, is substantially vertical (and consequently the rotation of the plate 1). The rotation of the plate (caused by the rotation of the support) may be useful for obtaining a uniform cooking of the food, in particular in those cases wherein—e.g. due to the physical configuration of the waveguide that opens in the muffle—it is not possible to achieve a symmetrical and or uniform distribution of the electromagnetic radiations in the muffle 11.

The microwave oven 10 comprises a microwave source 11*a* (in particular a magnetron) configured for generating an electromagnetic radiation, a cavity (in particular a muffle 11 internal to the casing of the microwave oven 10 and closable through a door 12) configured for accommodating food items to be heated or cooked or thawed and guiding means (in particular a waveguide 11*b*) configured for allowing the electromagnetic radiation to be transferred from the microwave source 11*a* to the cavity. FIG. 1 further shows some schematic details of the microwave oven 10: a control unit and/or user interface 14, configured to allow the user select and/or see at least one among a proper cooking program, electromagnetic radiation power, cooking time, ventilation of the muffle 11, remaining cooking time, activation or deactivation of the oven. The microwave oven 10 further comprises a door 12, which preferably is provided with a transparent section 13, in particular a glass pane, conceived for allowing the user see the food while cooking when the door 12 is closed.

The aim of the plate 1 is to enhance the uniform heating of the food and the heating efficiency of microwave oven for improving the cooking performances.

FIG. 2 shows a section of the plate 1 according to the present disclosure. As it can be seen, the plate 1 comprises a central substantially flat portion and an external raised portion 1*k*. In an embodiment, which is clearly not limiting albeit preferable, the plate 1 presents a substantially axi-symmetric shape. This means that, in this specific embodiment, the external raised portion 1*k* defines a perimetric raised ring or wall suitable to allow the plate 1 to contain substantially fluid and/or liquid food, while mitigating the risk of dispersion during the cooking in the muffle 11.

The external raised portion 1*k* defines at least one wall that is inclined with respect to the central substantially flat portion. In an embodiment, the external raised portion 1*k* may be substantially orthogonal with respect to the central substantially flat portion.

FIG. 3 shows a first embodiment of the plate 1 according to the present invention and in detail proposes a detailed view of the layers composing the plate 1. FIG. 3 could be seen as a section according to line A-A of FIG. 2 of a portion of the plate 1.

In the embodiment of FIG. 3, it can be seen that the plate 1 comprises a substrate layer 1*s* configured for supporting food items to be cooked in the microwave oven 10. In particular, the substrate layer 1*s* is configured to have a robustness and/or has a rigidity sufficient to realize a self-sustaining shape of the plate 1 even without the help of any further layer. In other words, the substrate 1 is configured to sustain at least the weight of the food that is typically cooked in a microwave oven.

The thickness of the substrate layer 1*s* is chosen by the technician in accordance to the overall size of the plate 1. Preferably, albeit in a non-limiting extent, the thickness of the substrate layer 1*s*, measured along a direction that is substantially orthogonal to the plane along which the substrate layer Is mainly extends, is substantially constant.

The plate 1 comprises at least a first coating layer 1*c* configured to be heated by means of the electromagnetic radiation in use irradiated by the microwave oven 10. In particular, the purpose of the coating layer 1*c* is to generate heat when invested by the electromagnetic radiation irradiated by the microwave oven. In particular, the material of the coating layer 1*c* is suitable to generate heat when invested by an electromagnetic radiation in the field of the microwaves (300 MHz to 300 GHz). The Applicant notes that, in general, consumer microwave ovens exploit the ISM microwaves band of 2.4-2.5 GHz (formally, the carrier lays at 2.45 GHZ), and for such reason the coating layer 1*c* may be preferably particularly configured to generate heat when radiated by a radiation in the 2-3 GHz band.

Albeit this shall not be considered limiting, a preferred thickness of the coating layer 1*c* lies in the range 1 mm to 4.5 mm, preferably 1.5 mm to 4 mm, more preferably 2 mm to 3.5 mm, even more preferably 2.5 mm to 3 mm. In an embodiment, the coating layer 1*c* is obtained through injection moulding (this however shall not be seen as a limitation since the coating layer 1*c* may alternatively applied e.g. by being sprayed on the substrate layer 1*s*).

Given a first thickness for the substrate layer 1*s* and given a second thickness for the coating layer 1*c*, in a preferred and non-limiting embodiment, the first thickness is greater than the second thickness.

Preferably, albeit in a non-limiting extent, the thickness of the coating layer 1*c*, measured along a direction that is substantially orthogonal to the plane along which the coating layer 1*c* mainly extends, is substantially constant.

The material with which the at least a first coating layer 1*c* is realized exhibits a selected Curie temperature lower than the desirable maximum temperature which is required by a proper food cooking.

The Curie temperature is the temperature beyond which a ferromagnetic material loses some intrinsic properties as the non-univocal correspondence between the external field and magnetization and therefore behaves similarly to a paramagnetic material.

The choice of materials having a proper Curie temperature is important to allow a proper cooking of the food in the microwave oven. In fact, in use, with the irradiation of the plate 1 by means of a microwave electromagnetic radiation, below the Curie temperature there is an energy absorption that causes an increase of the temperature of the material. In contrast, when the heating of the material causes its temperature to exceed the Curie temperature, independently of the electromagnetic radiation the energy absorption will substantially cease; in the areas of the material wherein the Curie temperature is exceeded, the conduction of heat is substantially stopped. The overall behavior of the plate 1 is such that it can reach a temperature ranging between 250° C. and 290° C., more preferably, between 260° C. and 280° C. when subjected to a microwave electromagnetic radiation having a frequency in the range 2-3 GHZ, more preferably in the range 2.4-2.5 GHz at a power of 900-950 W.

A contacting surface is defined between the at least a first coating layer 1*c* and the substrate layer 1*s*, this contacting surface being substantially planar; this helps reducing the risk that some air bubbles remain trapped between the two layers.

The coating layer 1*c* is specifically configured to improve the heat spreading, the spreading uniformity and the heating rate of the plate 1 when irradiated by such electromagnetic radiation.

In detail, the coating layer 1*c* is a multilayer coating and comprises at least a first layer 1*c*' and a second layer 1*c*". The coating layer 1*c* comprises at least one between a ferritic material and a boron nitride compound. Boron nitride (hBN) is an optimal choice when there is a requirement of heating by means of an electromagnetic radiation, especially within the 2-3 GHz band. In an embodiment, a substantially planar contacting surface is defined between the first layer 1*c*' and the second layer 1*c*".

Preferably, albeit in a non-limiting extent, the thickness of the first layer 1*c*', measured along a direction that is substantially orthogonal to the plane along which the first layer 1*c*' mainly extends, is substantially constant. As well, the thickness of the second layer 1*c*", always measured along a direction that is substantially orthogonal to the plane along which the second layer 1*c*" mainly extends, is substantially constant.

Preferably, albeit in a non-limiting extent, the ferritic material comprises a manganese-zinc ferritic compound or a nickel-manganese ferritic compound or even a nickel-copper-zinc ferritic compound. Several embodiments of those two types of compound have been studied and selected for tests by the Applicant. Among those several embodiments, in particular the $Ni_{0.5}Mn_{0.5}F_2O_4$ compound, the family $(Mn_xZn_yFe_2{}^{+1}{}_{-x-y})Fe_3{}^{+2}O_4$ of manganese-zinc ferritic compounds and the $Ni_{0.60-y}Cu_yZn_{0.42}Fe_{1.98}O_{0.39}$ compound are ferritic compounds having Curie temperatures compatible with the scope of allowing a proper cooking, eventually browning, of the food.

In an embodiment, any of the aforementioned compounds, especially the $Ni_{0.60-y}Cu_yZn_{0.42}Fe_{1.98}O_{0.39}$ compound, may optionally comprise $Bi_2O_3$. The $Ni_{0.5}Mn_{0.5}F_2O_4$ compound has a Curie temperature of about 350° C.

Between the at least two layers 1*c*', 1*c*" forming the coating layer 1*c*, the first layer 1*c*' is an outer, superficial layer, and the second layer 1*c*" is an inner (or buried) layer and is in contact with the substrate layer 1*s*. This means that the first layer 1*c*' of the coating layer 1*c* is the layer that the user may touch when manipulating the plate 1 and that may also be in contact with the food, so that the first layer 1*c*' can advantageously have food-compatibility properties.

In an advantageous embodiment of the present disclosure (shown in FIG. 3), the coating layer 1*c* is applied only to the lower surface of the substrate layer 1*s*, i.e. only to the surface of the substrate layer 1*s* opposite to the surface destined for coming into contact with the food.

The Applicant specifically notes that, even if the schematic section of FIG. 3 shows the coating layer 1*c* laying below the substrate layer 1*s*, the present invention shall not be intended as to be limited in that the coating layer 1*c*, in use conditions of the plate 1, is necessarily below the substrate layer 1*s*. Indeed, the plate 1 (due to the food-compatibility of the coating layer 1*c*) may alternatively have the coating layer 1*c* above the substrate layer Is in the conditions of use, i.e. in the spatial orientation depicted in FIG. 2 wherein the concavity of the plate is directed upwards.

The substrate layer 1*s* may be made of metal, e.g. aluminum. In a preferred and non-limiting embodiment, the substrate layer 1*s* is at least partially made of an electrically insulating material and, in particular, comprises a glass ceramic material and/or a glass-fiber reinforced plastic. This latter material provides a good electric insulation, which is important when the plate 1 is irradiated with such electromagnetic radiation generated by the magnetron of the microwave oven (since otherwise it may conduct the electric current induced by the electromagnetic radiation), and provides also a sufficient robustness to support the weight of the food. Moreover, the glass ceramic material has a very low reacting behavior with any acid or basic substance that may be found in foods.

In the specific embodiment shown in FIG. 4, the first layer 1*c*' comprises a boron nitride (hBN) compound.

The second layer 1*c*" comprises a polymeric matrix, being provided with a silicone. In a preferred, non-limiting embodiment, one type of polymer considered to be suitable for the coating of the present concept is RBL-9050-50P Liquid Silicone Rubber. Two-pair, 10 to 1 mix, clear, fabric coating grade liquid silicone rubber offers unique homogeneous mixing. This two-part pre-polymerized polymer composite is the 10 to 1 mix, clear, fabric coating grade liquid silicone rubber which has an extremely low viscosity, no post-curing requirements, and excellent electrical insulating properties. Furthermore, the two-part pre-polymerized polymer composite is equally suitable for spray-on and dip coating applications. The 10 to 1 mix of this polymer refers to the 10 to 1 base to catalyst 87-RC ratio of the polymer.

The Applicant has tested several embodiments for the second layer 1*c*" comprising a predefined ratio between the ferritic powders and the polymer, especially the silicone. The tests were conducted with percentage ratios by weight (wt %) between the ferritic powders and silicones between 70:30 and 90:10, and in particular with percentage ratios by weight (wt %) between the ferritic powders and silicones between 75:25 and 85:15. Tests were conducted with both solid and liquid silicones. Hereinafter an excerpt of four tests performed by the Applicant is proposed.

Test 1: in one non-limiting embodiment the percentage ratio by weight (wt %) between the ferritic powders and the silicone was 78:22; in test 1, the silicone was solid silicone.

Test 2: in another non-limiting embodiment the percentage ratio by weight (wt %) between the ferritic powders and the silicone was 80:20; in test 2, the silicone was solid silicone.

Test 3: in another non-limiting embodiment, the percentage ratio by weight (wt %) between the ferritic powders and the silicone was 82:18; in test 3, the silicone was solid silicone.

Test 4: in another non-limiting embodiment, the percentage ratio by weight (wt %) between the ferritic powders and the silicone was 82:18; in test 4, the silicone was liquid silicone.

In a preferred, non-limiting embodiment, the polymeric matrix comprises a bi-component, pre-polymerized polymer. Precisely, the second layer 1*c*" may result as a composite ferritic-polymer-carbon layer.

In the specific embodiment shown in FIG. 4, the second layer 1*c*" comprises the $Ni_{0.5}Mn_{0.5}F_2O_4$ compound and preferably is constituted by the $Ni_{0.5}Mn_{0.5}F_2O_4$ compound, excepting impurities.

In another embodiment, not shown in figures, the second layer 1*c*" comprises the family $(Mn_xZn_yFe_2{}^{+1}{}_{-x-y})Fe_3{}^{+2}O_4$ of manganese-zinc ferritic compounds and preferably is constituted by the family $(Mn_xZn_yFe_2{}^{+1}{}_{-x-y})Fe_3{}^{+2}O_4$ of manganese-zinc ferritic compounds, excepting impurities.

The $Ni_{0.5}Mn_{0.5}F_2O_4$ compound, or the family $(Mn_xZn_yFe_2{}^{+1}{}_{-x-y})Fe_3{}^{+2}O_4$ of manganese-zinc ferritic compounds, and the polymeric matrix are blended together.

The second layer 1*c*" of the coating layer 1*c* further comprises also a carbon material which is further blended, in particular uniformly blended, with the ferritic material. In detail, the embodiment of FIG. 4 shows that the second layer 1*c*" comprises the $Ni_{0.5}Mn_{0.5}F_2O_4$ compound uniformly blended with the carbon material.

Another embodiment comprises the second layer 1*c*" being provided with any of the compounds of the family $(Mn_xZn_yFe_2{}^{+1}{}_{-x-y})Fe_3{}^{+2}O_4$ of manganese-zinc ferritic compounds blended with the carbon material. Another embodiment comprises the second layer 1*c*" being provided with the $Ni_{0.60-y}Cu_yZn_{0.42}Fe_{1.98}O_{0.39}$ compound blended with the carbon material.

In an embodiment, which is non-limiting, the carbon material comprises a carbon ferritic powder. The carbon ferritic powder exhibits a low Curie temperature, which lays around 210° C.

In terms of structure of the components of the coating layer 1*c*, the Applicant studied several types of carbon materials and realised that a particularly efficient material may comprise carbon nanotubes. As well, the $Ni_{0.5}Mn_{0.5}F_2O_4$ compound or any of the compounds of the family $(Mn_xZn_yFe_2{}^{+1}{}_{-x-y})Fe_3{}^{+2}O_4$ of manganese-zinc ferritic compounds, or even the $Ni_{0.60-y}Cu_yZn_{0.42}Fe_{1.98}O_{0.39}$ compound, may comprise ferromagnetic nanowires. Exploiting nanotubes and nanowires properties allows realizing very precise, dense layers, whose property of heating distribution is uniform. As well, exploiting nanotubes and nanowires allows realizing a uniform surface of the layers, which therefore can be sandwiched together in a very precise way. Furthermore, exploiting nanotubes and nanowires properties allows realizing also very thin layers. Albeit this shall not be considered limiting, the nanotubes may be single-walled nanotubes or double-walled nanotubes. In an embodiment, the nanotubes may have a common, or unidirectional, orientation.

The Applicant realised as well that, when the plate 1 is heated by the electromagnetic radiation, an optimization of the performances of heating rate and distribution can be obtained by choosing specific ranges of weight ratios between the carbon material and the ferritic materials.

In detail, in an embodiment, in the second layer 1*c*" the carbon material is blended with the ferritic material in an amount of 1.0 wt % to 6.0 wt %. With the wording "wt %" it is intended percentage by weight. Specifically, in the second layer 1*c*" the carbon material is blended with the $Ni_{0.5}Mn_{0.5}F_2O_4$ compound, or alternatively with any of the compounds of the family $(Mn_xZn_yFe_2{}^{+1}{}_{-x-y})Fe_3{}^{+2}O_4$ of manganese-zinc ferritic compounds, or even alternatively with the $Ni_{0.60-y}Cu_yZn_{0.42}Fe_{1.98}O_{0.39}$ compound, optionally comprising $Bi_2O_3$, in an amount of 1.0 wt % to 6.0 wt %. This means that the ratio between the carbon material and the ferritic material may be, at the ends of the aforementioned ranges, 1.0 wt % of carbon material and 99.0 wt % of ferritic material or, at the opposite end of the range, 6.0 wt % of carbon material and 94.0 wt % of ferritic material.

Preferably, albeit in a non-limiting extent, in the second layer 1*c*" the carbon material is blended with the ferritic material in an amount of 1.5 wt % to 5.5 wt %. Specifically, in the second layer 1*c*" the carbon material is blended with the $Ni_{0.5}Mn_{0.5}F_2O_4$ compound, or alternatively with any of the compounds of the family $(Mn_xZn_yFe_2{}^{+1}{}_{-x-y})Fe_3{}^{+2}O_4$ of manganese-zinc ferritic compounds, or even alternatively with the $Ni_{0.60-y}Cu_yZn_{0.42}Fe_{1.98}O_{0.39}$ compound, optionally comprising $Bi_2O_3$, in an amount of 1.5 wt % to 5.5 wt %. This means that the ratio between the carbon material and the ferritic material may be, at the ends of the aforementioned ranges, 1.5 wt % of carbon material and 98.5 wt % of ferritic material or, at the opposite end of the range, 6.5 wt % of carbon material and 93.5 wt % of ferritic material.

The purpose of the aforementioned blending ratio is to keep at least the second layer 1*c*" substantially electrically insulating and/or showing, when irradiated with the electromagnetic radiation within the specifications as above disclosed, an optimal heating behavior when invested by a field of electromagnetic fields oscillating in the microwaves domain.

Figure 5:
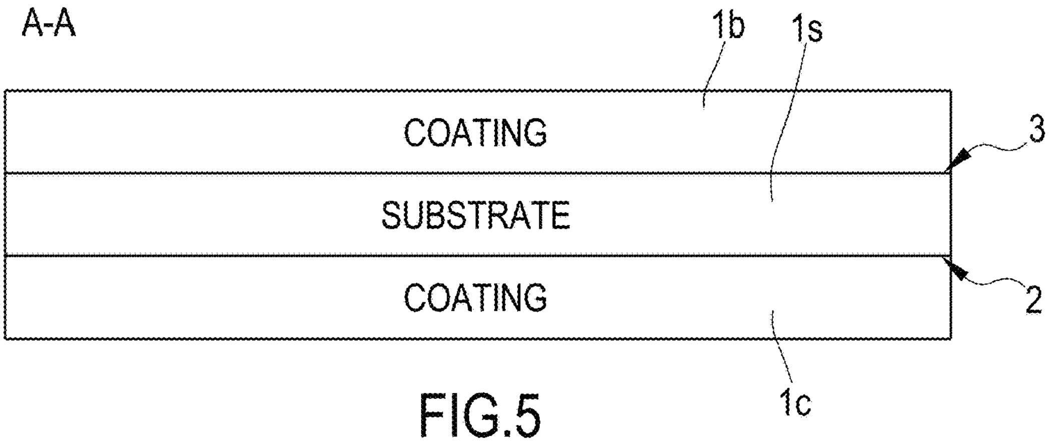
FIG. 5 shows a section view of a further embodiment of the plate according to the present disclosure.

FIG. 5 shows an alternative embodiment of the plate 1 herein disclosed, wherein the substrate layer 1*s* is sandwiched between two coating layers 1*c*. In fact, in FIG. 5 it may be appreciated that a first coating layer 1*c* is arranged above the substrate layer 1*s* and that a second coating layer 1*c* is arranged below the substrate layer 1*s*.

In FIG. 5, the reference number 2 identifies a contacting surface between the substrate layer 1*s* and the first coating layer 1*c* laying below the substrate layer Is and the reference number 3 identifies a contacting surface between the substrate layer 1*s* and the second coating layer 1*b* laying above the substrate layer 1*s*. Precisely, the first and the second coating layers 1*c*, 1*b* are arranged respectively at a first and at a second side of the substrate layer 1*s* and the first side and second side are opposite one with respect to the other. Those contacting surfaces are substantially planar, or at least have a plurality of planar portions allowing a proper contact with the juxtaposed layer.

Preferably, albeit in a non-limiting extent, at least one between the first contacting surface 2 and the second contacting surface 3 is substantially planar and/or is substantially parallel to the contacting surface that lays between the first layer 1*c*' and the second layer 1*c*".

In an embodiment, the first and the second coating layers have the same composition of materials; in another embodiment the first and the second coating layers may have a different composition of materials, especially concerning the composition of their second layers 1*c*", which in an embodiment may comprise different ferritic materials. The first and the second coating layers 1*c*, 1*b* have both the respective first layer 1*c*' comprising boron nitride (hBN) as above described. Said boron nitride can actually be hexagonal boron nitride.

Figure 6:
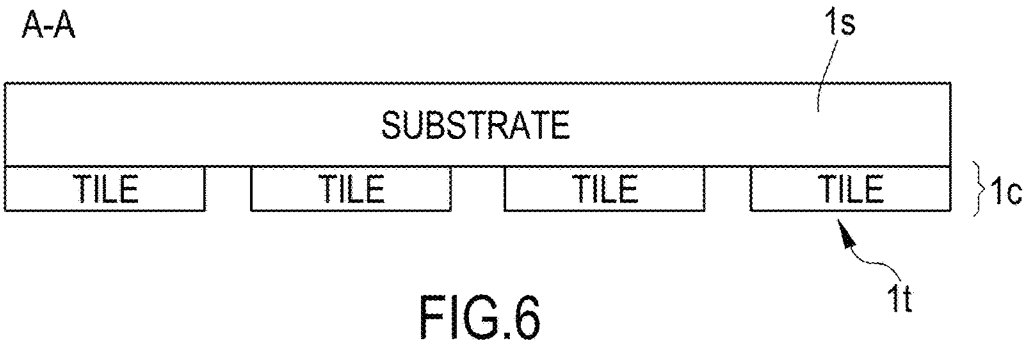
FIG. 6 shows a section view of a further embodiment of the plate according to the present disclosure.

The coating layer 1*c* may have a flat surface or a textures surface. FIG. 6 shows a particular embodiment of the plate 1 of the present disclosure. A coating layer 1*c* in form of a plurality of tiles 1*t* is applied to the substrate layer 1*s*. The composition of the coating layer 1*c* is the same as above described, and thus it is not completely repeated here. It is herewith remarked that all the tiles 1*t* have the first and the second layers 1*c*', 1*c*" as above described. Albeit this shall not be considered limiting, at least part of the plurality of tiles 1*t* has a thickness of 1.5 mm to 3.5 mm, preferably of 2 mm to 3 mm, more preferably of 2.5 mm to 2.75 mm.

In an embodiment, all tiles 1*t* of the plate 1 have the same composition of materials. In another embodiment, the plate 1 comprises at least a first tile and a second tile having a different composition of materials. Advantageously, the compositions of the tiles follows the axisymmetric shape of the plate 1 and may vary depending on the distance of the tile from the center of the plate 1, so that all tiles having the same distance from the center have the same composition of materials.

In an embodiment, the tiles 1*t* are separate one with respect to the other, and thus an interspace is left between two adjacent tiles 1*t*, such an interspace acting as venting channel and/or compensating for possible thermal expansion of the tiles 1*t*. In another embodiment, the tiles 1*t* are closely juxtaposed in such a way that substantially no interspace is left between two adjacent tiles 1*t*.

In order to provide a uniform outer surface of the plate 1, the tiles 1*t* have almost identical thickness with a substantially flat lower surface (where the lower surface is the surface of the tiles 1*t* opposite to that which contacts the substrate layer 1*s*).

The Applicant specifically notes that, even if the schematic section of FIG. 6 shows the plurality of tiles 1*t* forming the coating layer 1*c* laying below the substrate layer 1*s*, this shall not be intended that actually the plate 1 has the tiles 1*t* below the substrate layer Is in the conditions of use, i.e. in the spatial orientation depicted in FIG. 2 wherein the concavity of the plate is directed upwards. In fact, the tiles 1*t* forming the coating layer 1*c* may be, in such conditions of use, also above the substrate layer 1*s*. In an embodiments, tiles 1*t* as previously described may be applied to both opposite surfaces of the substrate layer 1*s*.

Figure 7:
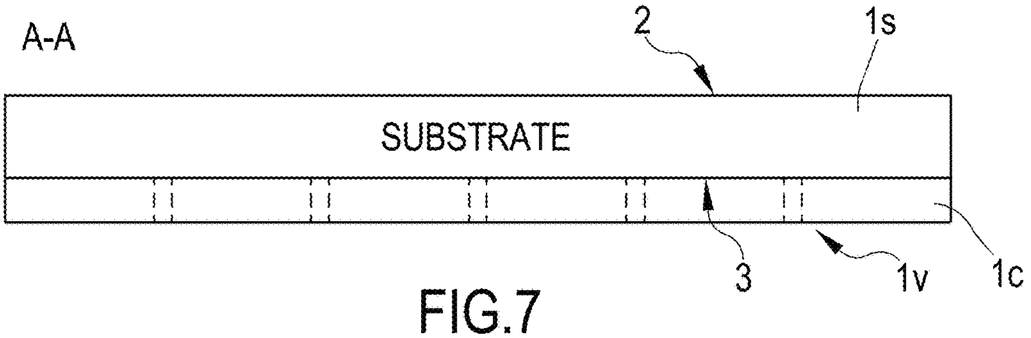
FIG. 7 shows a section view of a further embodiment of the plate according to the present disclosure.

FIG. 7 shows another embodiment of the plate 1 according to the present disclosure, wherein a plurality of venting openings 1*v* is arranged in the coating layer 1*c*. It is noted that FIG. 7 shows an embodiment wherein only a single coating layer 1*c* is juxtaposed on the substrate layer 1*s* on its lower side. This does not mean that this is the only embodiment wherein the venting openings 1*v* may be present. In fact, venting openings 1*v* may be present also in embodiments of the plate 1 wherein the substrate layer 1*s* is sandwiched between a first and a second coating layers 1*c*, 1*b* similarly to the embodiment of FIG. 5. In this latter case, the venting openings 1*v* may be present in the first coating layer 1*c* (i.e. the coating layer laying below the substrate layer 1*s*) of in the second coating layer 1*b* (i.e. the coating layer laying above the substrate layer 1*s*) or in both the first and the second coating layers.

Preferably, albeit in a non-limiting extent, the venting openings 1*v* are in a form of holes that extend in a direction substantially transversal with respect to the direction along which the substrate layer 1*s* and/or the coating layers 1*c* substantially mainly extend. In particular, FIG. 7 shows an embodiment wherein the venting openings 1*v* are arranged along a direction substantially perpendicular to the direction along which the substrate layer 1*s* and/or the coating layer 1*c* mainly extends.

FIG. 7 shows an embodiment wherein the venting openings 1*v* extend along the entire thickness of the coating layer 1*c* in such a way to expose substantially part of the underlying substrate layer 1*s*; this shall not be intended as limiting, since in another embodiment, which is not shown in the annexed figures, the venting openings 1*v* may extend only for part of the thickness of the coating layer 1*c*. An adequate distance between a couple of consecutive venting openings 1*v* is 3 mm to 28 mm, preferably 9 mm to 18 mm.

It shall be intended that the venting openings 1*v* may have a substantially constant cross-section, or a variable cross-section; the cross-section may assume a substantially rounded shape or any other type of shape. As an alternative to the venting openings 1*v*, venting channels (in particular extending along two directions transversal to each other) may be envisaged.

Figure 8:
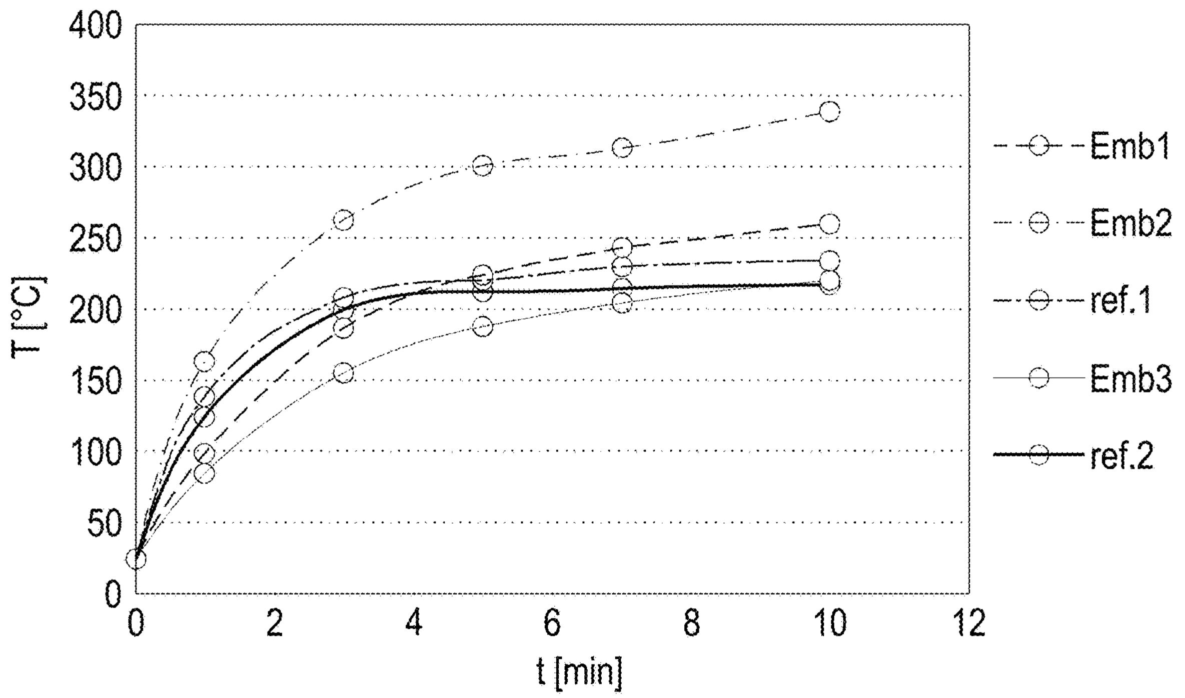
FIG. 8 shows a diagram of temperatures reached by several embodiments of the plate over time.
Figure 9:
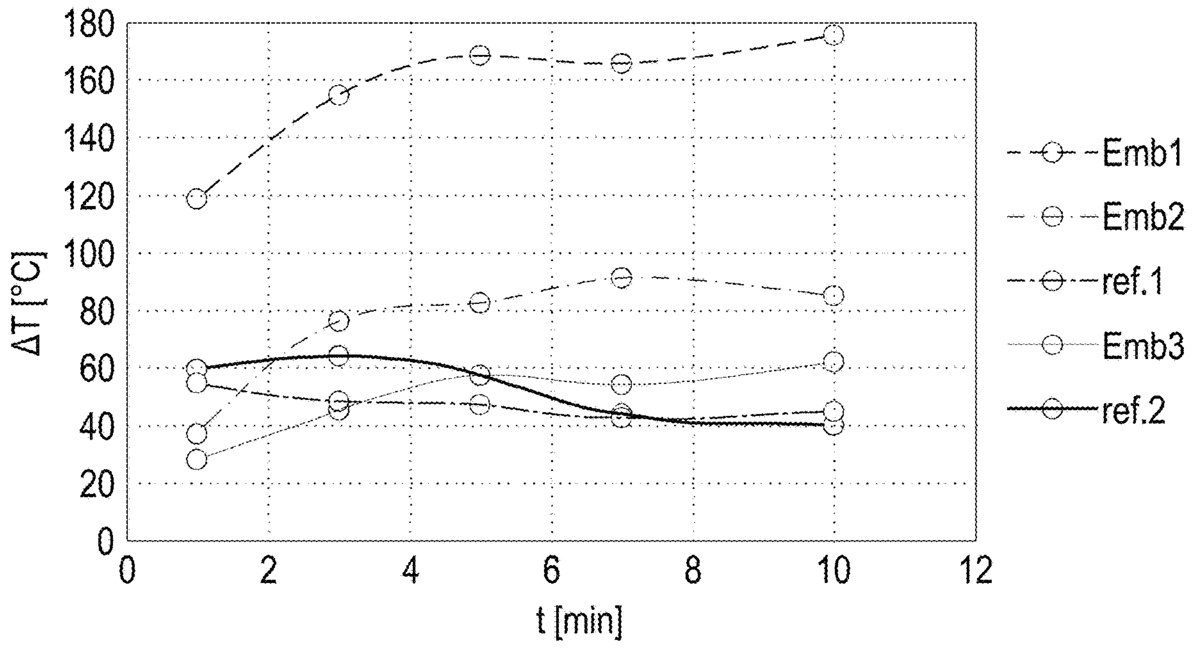
FIG. 9 shows a diagram of temperature differentials over time of several embodiments of the plate.

FIGS. 8 and 9 shows diagrams of absolute temperature and of temperature differentials over time that are obtained by several examples of plates 1 according to the present disclosure (embodiments 1, 2 and 3, abbreviated with emb.1, emb.2, emb.3) and according to the known art (ref.1, ref.2). Embodiments 1, 2, 3 differ to each other in that the active ingredients are present in the matrix in different loading concentrations. For instance, embodiments 1 and 2 differ to each other because of a different concentration of the carbon nanotubes (around 4.55% in embodiment 1 vs. around 1.5% in embodiment 2).

The graph of FIG. 8 is obtained by keeping constant the power of the electromagnetic radiation with which the plate 1 is irradiated (in particular at 950 W). It is noted that the embodiments 1 and 2 obtain the most important temperature increase over the time and this means that they heat more and before other embodiments and the plates known in the art.

In particular, it may be preferable that the coating layer 1*c* is configured to reach at least a surface temperature of 200° C., preferably at least of 210° C., more preferably at least of 220° C. in 3 minutes, when the plate 1 is heated by a microwave oven 10 irradiating an electromagnetic radiation at a power of at least 750 W or of at least 950 W.

The graph of FIG. 9 shows a diagram that is obtained by keeping constant the power of the electromagnetic radiation with which the plate 1 is irradiated (in particular at 950 W). This diagram shows that the plate according to embodiment 1 has a temperature differential (the difference of the temperature between the hottest and the coldest part of the plate 1) which is higher than that of embodiment 2 and embodiment 3; the temperature differentials of embodiments 2 and 3 indeed are confined respectively within 100 degrees Celsius and within 60 degrees Celsius.

In particular, it may be preferable that the coating layer 1*c* is so configured that the temperature differential is kept in the ranges of 40 degrees Celsius to 60 degrees Celsius, when the plate 1 is heated by a microwave oven 10 irradiating an electromagnetic radiation at a power of at least 750 W or of at least 950 W.

Figure 10:
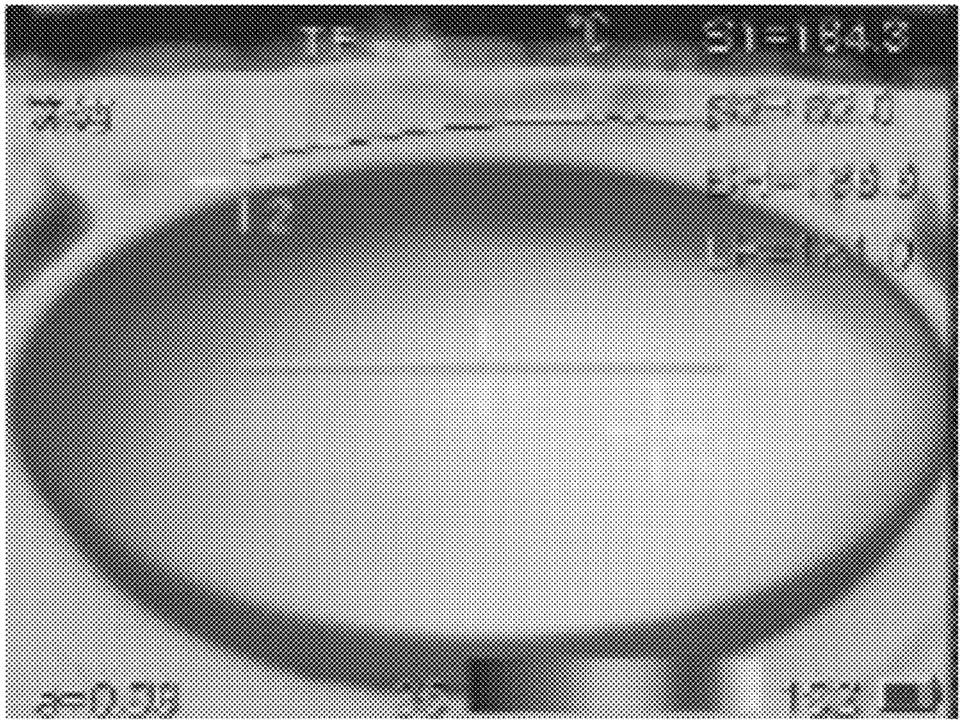
FIG. 10 shows a thermal image of the plate heated by a radiofrequency source.

FIG. 10 shows a thermal image captured by means of a thermal camera and referring to a specific embodiment of the plate 1 according to the present disclosure, being irradiated by an electromagnetic radiation at 2.45 GHz in a microwave oven. In FIG. 10, the zones of the image being darker are colder than the zones of the image being whiter. It is apparent that the central substantially flat portion of the plate 1 is substantially uniform in temperature.

Preferably, the plate 1 being provided with the at least one coating layer 1*c* as above described, is configured to keep a temperature difference between a hottest portion of the plate 1 and a coldest portion of the plate 1 within the range 20° C.-80° C., preferably within the range 30° C.-70° C., more preferably within the range 40° C.-60° C.

Figure 11:
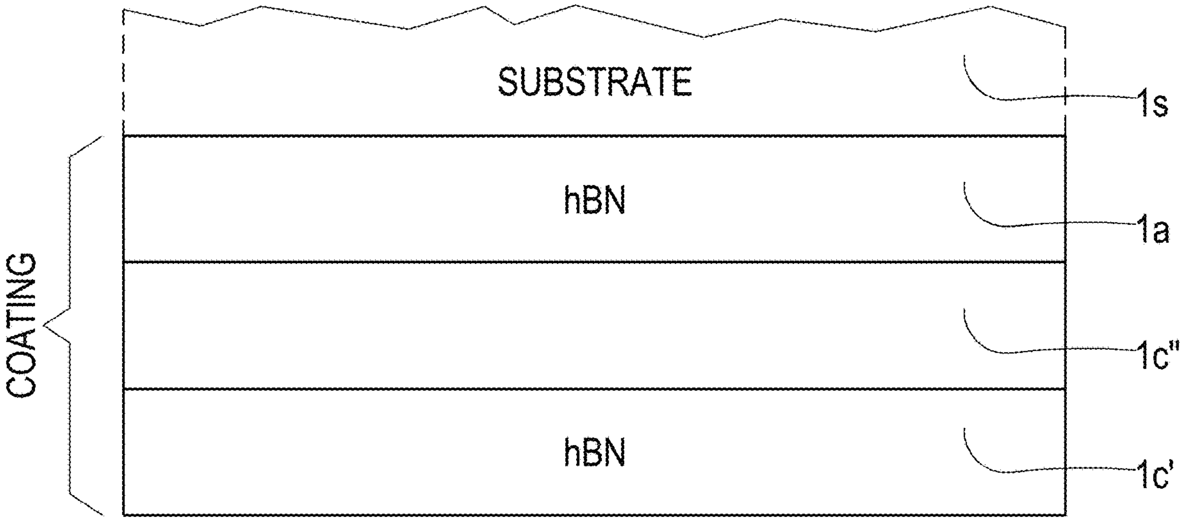
FIG. 11 shows a further embodiment of the plate according to the present disclosure.

FIG. 11 discloses a further embodiment of the plate according to the present disclosure (presented in particular as a variant to the embodiment of FIG. 4). The plate 1 comprises a substrate layer Is that has the features already disclosed in the present document, which therefore are not repeated.

This latter embodiment comprises at least a first coating layer 1*c* which is provided with a first layer 1*c*', a second layer 1*c*" and an auxiliary layer 1*a*. Preferably, the first layer 1*c*' and the auxiliary layer 1*a* comprise a boron nitride compound, which is configured to cause a substantial distribution of heat induced, in use, by the electromagnetic radiation irradiated by the microwave oven 10.

Preferably, albeit in a non-limiting extent, the thickness of the auxiliary layer 1*a*, measured along a direction that is substantially orthogonal to the plane along which the auxiliary layer 1*a* mainly extends, is substantially constant.

Moving from the top to the bottom, the section of the plate 1 according to the embodiment of FIG. 11 is composed as follows. The top layer is formed by the substrate layer 1*s*. This latter is juxtaposed to the auxiliary layer 1*a* comprising the boron nitride compound. The auxiliary layer 1*a* is juxtaposed to the second layer 1*c*", and thus results sandwiched between the substrate layer 1*s* (at the top) and the second layer 1*c*" (at the bottom). In turn, the second layer 1*c*" is juxtaposed to the first layer 1*c*'. Thus, the second layer 1*c*" is sandwiched between the first layer 1*c*' and the auxiliary layer 1*a*.

While FIG. 11 shows that the coating layer 1*c* provided with the auxiliary layer 1*a* is only provided below the substrate layer 1*s*, it may be noted that according to a further non-limiting embodiment the coating layer 1*c* provided with such auxiliary layer 1*a* may be also provided, or alternatively provided, above the substrate layer 1*s*.

Venting openings and/or tiles as above described may be provided in the coating layer 1*c* also when this latter is provided with the auxiliary layer 1*a*. In this latter case, it may be noted that the venting openings 1*v* may extend from the first layer 1*c* up to the auxiliary layer 1*a*.

More generally, the present invention is open to several variants wherein above described layers are alternated in different ways. For instance, a variant may be contemplated wherein layers comprising the boron nitride compound are alternated to layers comprising the ferritic material.

In fact, the present invention may contemplate several sandwich structures for the coating of the plate 1, wherein the elements of the sandwich structures are in particular the base matrix with the ferrites, the boron nitride film and the carbon nanotubes. Inter alia, a sandwich structure formed by base matrix ferrite layers and boron nitride film layers alternating with each other may be envisaged. A further sandwich structure wherein several layers of base matrix are covered (internally and/or externally) by a boron nitride layer may be envisaged as well.

The advantages of the plate 1 according to the present disclosure are clear in view of the above description.

The plate 1 is capable of being heated very efficiently by microwaves radiation and this helps in reducing the power required to properly heat food from the bottom part thereof in a microwave oven.

The efficient heating obtained by the coating layer of the plate 1 here described indirectly allows to lengthen the lifetime of the magnetron of the microwave oven, since for a same reached cooking temperature, the amount of power required by the magnetron is lower than that is required with supporting plates of the known art.

The plate 1 according to the present disclosure helps achieving high-energy efficiency rates; in such a way, when the plate 1 is arranged in the microwave oven, the overall assembly realized by the microwave oven and the plate 1 complies easily with even stringent energy efficiency regulations.

The plate 1 according to the present disclosure helps in providing a proper food cooking and mitigates the risk of overcooking of the lateral and top portion of foods with respect to the lower portion of the food. In detail, the plate 1 helps to achieve a proper uniform cooking and/or browning of the food especially when in use is rotated by the support in the muffle of the microwave oven.

The plate 1 according to the present disclosure heats fast, and thus a small amount of time is required to achieve a proper cooking temperature of the bottom of the food.

The plate 1 according to the present disclosure has a very effective heating distribution behavior and, in particular, a very effective heating uniformity behavior; this reduces the impact of the food positioning on the plate 1 on the achievement of an optimal cooking.

The plate 1 according to the present disclosure is food-compatible, and therefore no issues are present in case any food is directly put in contact with the plate 1, especially with the coating layer 1*c* and/or with the substrate layer 1*s*. The plate 1 is hence immune from any toxicity threats.

The plate 1 according to the present disclosure is advantageously conceived in such a way to reduce the risk of permanence of air bubbles within, or between, the layers of the substrate or of the coating. This reduces the risk of detachment of the coating layer from the substrate layer when the plate 1 is heated.

The plate 1 is realized with materials that allow a cost-saving production and that allow to obtain very smooth surfaces, that provide an overall quality aspect when seen by a user.

The thickness of the coating layer 1*c* of the plate 1 according to the present disclosure can be further reduced with respect to the thickness of the coating layers of the known art without compromising the effectiveness of the heating distribution.

The thermal stability of the coating layer 1*c* is improved, and this contributes to lengthen the lifetime of the plate 1, mitigating the risk of detachment of the coating layer 1*c* with respect to the substrate layer 1*s*.

The plate 1 according to the present disclosure is very durable.

The plate 1 according to the present disclosure may be washed in a dishwasher with substantially no risk of significant affection or damaging to the coating layer.

It is herewith noted that the invention is not limited to the embodiments shown in the annexed figures; for such reason, in the following claims, reference numbers and signs are provided with the sole purpose of increasing the intelligibility of the claims, and for no reason shall be considered limiting.

It is finally clear that to the present invention additions and adaptation can be carried out without for this departing from the scope of protection provided by the annexed claims.

What is claimed is:

1. A plate for a microwave oven, comprising:

a substrate layer for supporting food items to be heated in the microwave oven, the substrate layer having a first surface; and a coating layer on the first surface, the coating layer including a first layer including a boron nitride compound, and a second layer contacting the first surface and including a ferritic material of at least one of a manganese-zinc ferritic compound, a nickel-manganese ferritic compound, and a nickel-copper-zinc ferritic compound, the second layer being embedded between the first surface and the first layer, wherein the coating layer is configured to be heated by electromagnetic radiation irradiated by the microwave oven.

2. The plate of claim 1, wherein the substrate layer has a first thickness, and the coating layer has a second thickness, and the first thickness is greater than the second thickness.

3. The plate of claim 1, wherein the first surface is a substantially planar contacting surface.

4. The plate of claim 1, wherein the second layer contacts the first surface and between the substrate layer and the first layer.

5. The plate of claim 4, wherein the second layer includes the ferritic material dispersed in a polymer matrix.

6. The plate of claim 5, wherein the polymer matrix is silicone.

7. The plate of claim 1, wherein the substrate layer includes a second surface opposite to first surface, the second surface being a upper surface in contact with the food items.

8. A plate for a microwave oven, comprising:

a substrate layer for supporting food items to be heated in the microwave oven, and a plurality of coating layers at least partially juxtaposed and in contact with the substrate layer, a first coating layer of the plurality of coating layers including a boron nitride compound, and a second coating layer of the plurality of coating layers including at least one of a ferritic material of at least one of a manganese-zinc ferritic compound, a nickel-manganese ferritic compound, and a nickel-copper-zinc ferritic compound, the second coating layer with the ferritic material positioned between the substrate layer and the first coating layer with a substantially planar contact surface therebetween; and an auxiliary layer of the plurality of coating layers in substantial contact with the substrate layer and positioned between the substrate layer and the second coating layer with the ferritic material, the auxiliary layer also comprising the boron nitride compound, wherein the second coating layer with the ferritic material is heatable by an electromagnetic radiation irradiated by the microwave oven.

9. The plate of claim 8, wherein the plurality of coating layers includes a second layer comprising a polymeric matrix being provided with a silicone, and the polymeric matrix comprises a bi-component pre-polymerized polymer.

10. The plate of claim 8, wherein the plurality of coating layers includes a second composite layer of a carbon material blended with the ferritic material.

11. The plate of claim 10, wherein the carbon material is carbon nanotubes, and the ferritic material is ferromagnetic nanowires, and the carbon nanotubes are blended with the ferritic material in an amount of 1.0 wt % to 7.0 wt %.

12. The plate of claim 8, wherein the ferritic material is a nickel-manganese ferritic compound, a nickel-copper-zinc ferritic compound, a manganese-zinc ferritic compound, a carbon ferrite compound, or combinations thereof.

13. The plate of claim 12, wherein the nickel-manganese ferritic compound is a $Ni_{0.5}Mn_{0.5}F_2O_4$ compound, the nickel-copper-zinc ferritic compound is a $Ni_{0.60-y}Cu_yZn_{0.42}Fe_{1.98}O_{0.39}$ compound, and the manganese-zinc ferritic compound is a $(Mn_xZn_yFe_2{}^{+1}{}_{-x-y})Fe_3{}^{+2}O_4$ compound.

14. The plate of claim 8, wherein the at least one coating layer has a textured surface and comprises a plurality of tiles abutting from the substrate layer or a plurality of venting openings configured to vent any gaseous residue trapped in the at least one coating layer and/or in the substrate layer.

15. The plate of claim 8, wherein the at least one coating layer is configured to reach a surface temperature of at least 200° C. when heated by the microwave oven irradiating an electromagnetic radiation at a power of at least 750 W.

16. An assembly comprising:

a microwave oven comprising a microwave source, a cavity, and a wave guide, the microwave source being configured for generating radiation, the cavity being configured for accommodating food items to be heated or cooked or thawed, and the wave guide transferring the electromagnetic radiation from the microwave source to the cavity; and a plate configured to be placed in the cavity of the microwave oven, the plate including a substrate layer having a top surface for supporting food items to be heated in the microwave oven, and a lower surface opposite to the top surface, and at least one coating layer at least partially juxtaposed and in contact with the substrate layer on the lower surface, the at least one coating layer includes at least a first layer including a boron nitride compound and a second layer including a ferritic material of at least one of a manganese-zinc ferritic compound, a nickel-manganese ferritic compound, and a nickel-copper-zinc ferritic compound, the second layer being positioned between the substrate layer and the first layer, wherein the at least one coating layer is heatable by the electromagnetic radiation irradiated by the microwave oven.

* * * * *